Oct. 10, 1967    E. J. CATOR    3,346,232
PUSH BUTTON FLUID VALVE
Filed Feb. 24, 1964
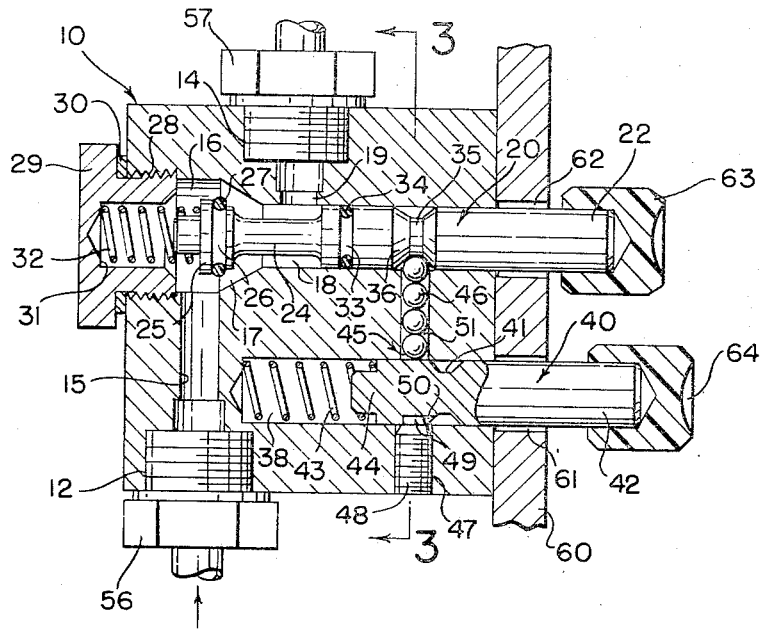
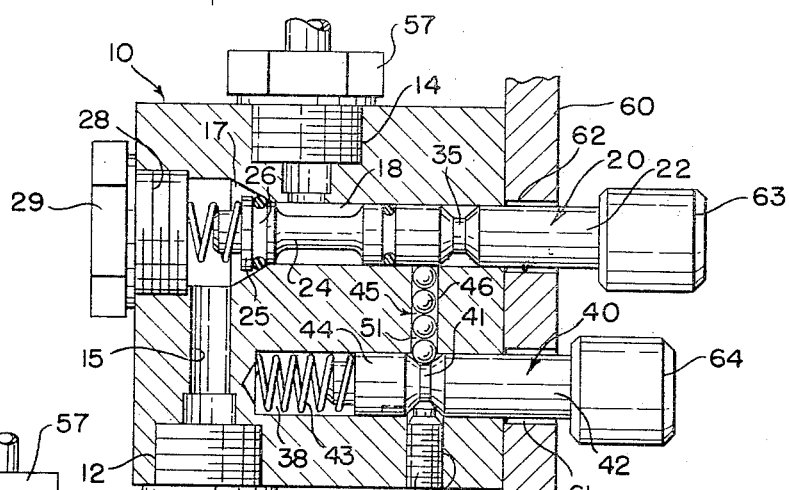
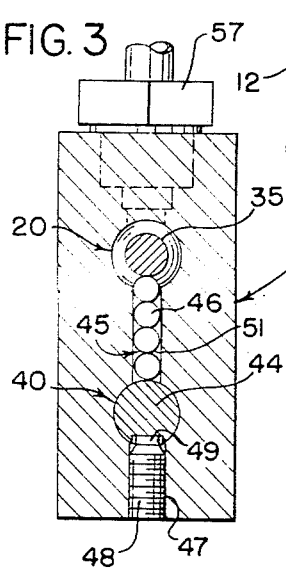
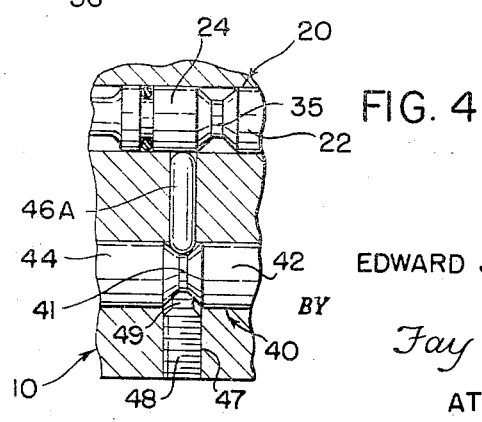
*INVENTOR.*
EDWARD J. CATOR
BY
*Fay & Fay*
ATTORNEYS United States Patent Office 3,346,232
Patented Oct. 10, 1967

3,346,232
PUSH BUTTON FLUID VALVE
Edward J. Cator, Rochester, N.Y., assignor to Crawford Fitting Company, Cleveland, Ohio, a corporation of Ohio
Filed Feb. 24, 1964, Ser. No. 346,944
15 Claims. (Cl. 251—66)

This invention relates to a positive acting on-off type push button valve which is adapted particularly for use on control panels for instrumentation systems. The valve of the invention is especially convenient and economical for use, for example, in multiple valve control panel installations where positively locked flow conditions and ganged mechanical operation are desired.

Broadly, the invention contemplates a push button valve adapted for control panel mounting having a housing with an inlet and an outlet port communicated by a valved flow passage. A first bore in the housing intersects the flow passage to define in common therewith a valve seat for cooperative valving action with an elongated valve core slidably and sealingly mounted for limited axial movement in the first bore. A valve core end projects from the bore end and spring means are provided which normally urge the valve core into sealing engagement with the valve seat. The end of the first bore opposite the projecting end of the valve core contains closure means in leak-tight engagement therewith. A second bore in the housing is located adjacent the projecting end of the valve core and contains an elongated locking member slidably mounted for limited axial movement in the second bore with an end projecting from the housing. A spring means is provided which normally urges the locking member to the limit of its axial movement in the direction of its projecting end. A third bore communicates the first bore with the second bore and has mounted therein a detent means for cammed alternative movement into tapered detent receiving grooves in the peripheries of the valve core and the locking member such that at least one of the grooves contains a portion of the detent means at all times.

The described valve elements are dimensioned such that movement of the valve core against the force of its associated spring out of sealing engagement with the valve seat permits the force of the spring associated with the locking member to move the locking member to its normally urged position and thereby simultaneously to cam the detent means out of its groove and into the groove of the valve core to lock the valve open for flow through the passage.

Similarly, the movement of the locking member against the force of its associated spring to a position in which its groove is aligned with the third bore permits the force of the spring associated with the valve core to move the valve core to its normally urged position. This movement causes the tapered sides of the valve core groove simultaneously to cam the detent means out of said groove and into the groove of the locking member to lock the valve closed to flow through the passage.

The push button valve constructed according to the principles of the present invention is ideally suited for use in instrumentation systems where often as many as ten or fifteen valves are mounted on a single control panel for ganged or individual operation to regulate the flow of air or other fluids or gases to the instruments. The valve has also been found effective for use in certain processing systems where the positive on-off action it provides is desirable.

Of particular advantage in using a valve constructed according to the principles of this invention has been the quick acting mechanical operation which permits the change of condition from on to off and from off to on by merely pushing the appropriate projecting member. These members are provided with visual indicators such as green and red buttons to distinguish the on button from the off button. The depression of either one causes simultaneous action in the other because of the cammed detent action caused by the tapered sides of the grooves on the elongated members.

Another advantage of this operation is that it eliminates the need for electrical circuitry, such as comparable solenoid operated valves required in that it permits ganged operation by means of a simple mechanical means, such as a cam bar which extends past a plurality of aligned valves so that by rotation it may depress simultaneously either the elongated valve core buttons or the elongated locking member buttons of all the valves by one simple operation.

A further advantage of the valve of this invention is that it is positively locked when it is in the on position or the off position and line pressure exerted in its flow passage cannot inadvertently open or close the valve.

In a preferred form, the housing and the components of the valve are easily manufactured from standard mill stock by conventional machine tools and metal removing procedures, and no special molds or tooling are necessary to produce the valve or replacement parts for it. In addition, the valve is extremely simple to assemble and disassemble in that it is constructed of a minimum of component parts.

The prior art valves for instrumentation use have generally utilized a rotary or toggle type action and have not permitted the positive and quick acting operation which the push button arrangement of the instant invention provides. In addition, these valves have not permitted simple mechanical ganged operation for a plurality of panel mounted valves, such as are commonly found in instrument control systems. Moreover, the rotary and toggle type valve in the prior art have not provided a simple distinctive visual indication for rapid identification of the open or closed condition of a plurality of the valves.

Another inherent disadvantage of the prior art type of valves has been the necessity to cast or otherwise provide complicated internal passages and chambers within the valve housing. The simplicity of design of the instant valve, of course, obviates this costly and widely used manufacturing practice.

With the problems and disadvantages of the prior art devices in mind it is a general object of this invention to provide a push button valve for use in instrumentation or processing systems which is of extremely simple and efficient design.

It is a further object of the invention to provide a push button valve especially adapted for easy panel mounting in instrumentation systems.

Another object of the present invention is to provide a positive acting push button valve capable of use in ganged operations by means of a simple mechanical operating means.

It is an additional object of the invention to provide a push button valve in which pressure in the chamber cannot inadvertently open or close the valve.

It is a further object of the invention to provide a push button valve in which the housing and component parts are simple to machine from standard stock.

It is an additional object of the invention to provide a push button valve which is simple to assemble during manufacturing and disassemble for maintenance.

It is an additional object of the invention to provide a quick acting push button valve which is adapted for ganged mounting on control panels for instrumentation or processing systems.

Other and more specific objects of the invention will be apparent from the detailed description in follow.

In the drawings, like numerals are used to designate like parts throughout.

FIG. 1 is a cross-sectional view of the push button valve constructed according to the principles of this invention with the valve in the open condition, FIG. 2 is a view similar to FIG. 1 with the valve in closed position.

FIG. 3 is a cross-sectional view taken along the line 3—3 of FIG. 1.

FIG. 4 is a fragmentary view taken along the broken line 4—4 of FIG. 2 illustrating an alternative detent means in the embodiment illustrated in FIGS. 1–3.

The illustrated push button valve constructed according to the principles of this invention includes a housing 10 having an inlet port 12 and an outlet port 14 communicated by means of a flow passage disposed therethrough. The flow passage is defined by a straight inlet passage portion 15, a chamber 16 and a tapered valve seat 17 transverse thereto and defined in common with the flow passage by a bore 18 generally transverse to the flow passage portion 15. A straight outlet passage portion 19 intersects the bore 18 at a point spaced from the valve seat 17 on the side opposite the portion 15 and communicates the chamber 16 with the outlet port 14 through the valve seat 17 and a portion of the bore 18. In the illustrated embodiment, the bore 18 extends through the housing 10 such that the chamber 16 is a counterbore of the bore 18 and the valve seat 17 and flow passage portion 19 are located intermediate the said counterbore and the end of the bore 18 opposite thereto.

A valve core 20 is slidably and sealingly mounted in the bore 18 and projects from the end opposite the counterbore to provide a substantial exposed projecting portion 22. The valve core 20 has a reduced portion 24 adjacent the end opposite the projecting end 22 which is spaced therefrom by a valve head or flange 25. The valve head 25 is appropriately dimensioned for prevention of its movement into the major of the bore 18 and is disposed in the chamber 16 in opposition to the valve seat 17 for cooperative sealing engagement therewith. On the periphery of the head 25 opposing the valve seat 17 is a peripheral groove 26 having an O-ring 27 mounted therein for movement into and out of sealing engagement with the tapered valve seat 17.

The counterbored end of the bore 18 which defines the chamber 16 is appropriately threaded as at 28 to receive a closing cap 29 therein which is sealed in leak-tight relative to the housing 10 by means of an annular gasket 30. The cap 29 has a central cavity 31 in axial alignment with the bore 18 and a coil spring 32 is disposed therein which abuts against the head 25 of the valve core 20 to normally urge the O-ring 27 thereon into sealing valve-closed relation with the valve seat 17.

Adjacent the flow passage portion 19 on the side thereof opposite the valve seat 17 a groove 33 is provided in the periphery of the valve core 20 to receive an O-ring 34. A sliding seal is formed by the O-ring 34 during the axial movement of the valve core 20 within the bore 18 between the limits of its axial movement defined by the end cap 29 and the valve seat 17 as they alternately act on the valve core head 25. A detent receiving groove 35 of the valve core 20 between the projecting portion 22 and the O-ring 34 is provided with tapered sides 36 which act as cams in a manner to be explained hereafter.

A blind hole or bore 38 is located in the housing 10 adjacent the bore 18 generally parallel thereto such that an elongated locking member 40 mounted therein for slidable axial movement has a projecting portion 42 of dimension similar to that of the projecting portion 22 of the valve core 20. Spring means 43 mounted in the bottom of the bore or blind hole 38 abuts the end 44 of the elongated member 40 opposite projecting portion 42 to provide a force urging the locking member 40 axially in the direction of this projecting end 42. A groove 41 having tapered camming surfaces and a depth generally equal to that of groove 35 is provided on the periphery of the locking member 40 to perform the same detent receiving function for the member 40 as is provided for the valve core 20 oy the groove 35.

A bore 45 communicating the bore 18 with the bore 38 inwardly from and adjacent to the projecting end portions 22 and 42 is provided to receive a detent means 46, which may be, for example, a plurality of detent balls of suitable dimension for free rolling axial movement as a unit into and out of engagement with grooves 35 and 41. A continuation 47 of the bore 45 on the side of the locking member 40 opposite the valve core 20 communicates the bore 38 with an adjacent outer surface of the housing 10. The outer portion 47 of the bore 45 is provided with suitable threads for engagement by a threaded plug stop means 48 having an end 49 projecting into the bore 38 within a slot 50 of limited length on the periphery of the locking member 40. This arrangement provides for a limited axial movement of the locking member 40 in either direction.

The outer portion 47 of the bore 45 also facilitates the provision of the detent receiving portion 51 of the bore 45 during manufacturing in that it permits a straight through bore or hole intersecting the bore 38 and the bore 18 which may be easily provided by standard machine shop drilling or boring procedures. The detent means 46 mounted in the portion 51 of the bore 45 are of such dimension that they extend for a distance greater than the length of the bore portion 51 plus the depth of one of the grooves 35 or 41, and this, of course, insures that at least one of the grooves 35 or 41 contains a portion of the detent means 46 at all times.

The operation of the valve is such that movement of the valve core 20 against the force of its associated spring 32 moves the valve core head 25 and O-ring 27 out of sealing engagement with the valve seat 17 to a position in which the groove 35 is aligned with the bore 45. At this position the force of the spring 43 associated with the locking member 40 moves the locking member to position of maximum projection from the housing 20 which is its normally urged position. This movement of the locking member 40 simultaneously cams the detent means 46 out of the peripheral groove 41 and into the aligned peripheral groove 35 of the valve core 20 to lock the valve open for flow through the passage and between the O-ring 27 and the valve seat 17.

Movement of the locking member 40 against the force of its associated spring 43 to the limit of its axial movement away from the projecting end 42, as determined by the dimension of the slot 50, aligns the peripheral groove 41 with the bore 45 such that the force of the spring 32 associated with the valve core 20 moves the valve core 20 to its normally urged position with the valve core head 25 and O-ring 27 in sealing engagement with the valve seat 17. This movement of the valve core 20 in response to the force of the spring 32 simultaneously cams the detent means 46 out of the peripheral groove 35 and into the peripheral groove 41 of the locking member 40 to lock the valve in the closed position and prevent flow through the passage. Thus it will be seen that by pushing or depressing the projecting end 22 of the valve core 20 or the projecting end 42 of the locking member 20 the on-off condition of the valve of the invention is changed positively and the valve locked in its alternate position.

As seen in the FIGS. 1 and 2 of the drawings, the valve is mounted flush on a panel 60 having apertures 61 and 62 therein appropriately provided for receipt of the projecting portions 22 and 42. The projecting portions 22 and 42 are provided with a suitable visual distinguishing indicia to permit them to be easily distinguished and to insure that their condition is readily identified by a casual glance. A convenient manner of providing this visual indicia is to provide color coated caps 63 and 64 on the ends of the projecting portions 22 and 42 to act as push buttons in imparting axial movement to the elongated members when moving them against the force of their respective associated springs. The panel mounting of the valves shown should be understoood to be merely by way of example and should illustrate that the panel 60 could have a multiplicity of the valves mounted in gangs for the complete flow control of an instrumentation or processing system.

In connecting the push button valves of the invention into flow systems, external conduits or lines are connected to the inlet port 12 and the outlet port 14, respectively, by means of suitable connection means 56 and 57 mounted therein. Counterbored and tapped recesses may be provided in the ends of inlet port 12 and outlet port 14, as shown, to facilitate connection of the fittings 56 and 57 illustrated, or other external conduit connection means.

FIG. 4 illustrates alternative detent means 46A for use in the push button valve of the invention in place of the ball type detent means 46 illustrated in FIGS. 1 and 2. The detent means 46A is a pin or rod having bevelled edges for cooperative camming relationship with the tapered surfaces of the grooves 35 and 41 to insure smooth locking and unlocking operation of the push button valve in its alternate flow control conditions.

As will be recognized by those skilled in the art, the housing 10 and the other components of the push button valve constructed according to the principles of this invention may be easily manufactured from standard stock material by conventional machine shop metal removing principles. The arrangement of the valve seat being defined in common with the flow passage and the bore containing the valve core, greatly simplifies manufacturing of the housing and eliminates the problems which intricate valve chambers generally entailed in manufacturing. Furthermore, by use of the end cap 29, straight through machining operations may be used in producing the chamber 16, the valve seat 17 and the bore 18, and this has greatly simplified maintenance of the valve in that by unthreading the cap 29 from the threaded portion of the chamber 16 and removing the push button cap 63 from the projecting end 22 the valve core may be removed from the housing 10 for replacement or cleaning of the seals and other maintenance operations.

The external surfaces of the housing 10 are conveniently provided with planar or flat surfaces to facilitate the machining operations required for producing and threading the various bores described within the housing. The outer peripheral surfaces of the valve, however, do not require an accurate finish and therefore the housing 10 may be sequentially severed from an elongated piece of bar stock or other suitable material.

For ease of description, the principles of the invention have been set forth in connection with but a single illustrated embodiment showing one of the preferred forms of the invention. It is not my intention that the illustrated embodiment nor the terminology employed in describing it be limiting inasmuch as variations in these may be made without departing from the spirit of the invention. Rather I desire to be restricted only by the scope of the appended claims.

The invention claimed is:
1. A push button valve comprising:
a housing having an inlet port and an outlet port communicated by a flow passage;
a first bore in said housing intersecting said flow passage and defining in common therewith a valve seat having an inlet side and an outlet side;
an elongated valve core slidably and sealingly mounted in said first bore with an end projecting from said bore end adjacent the outlet side of said valve seat;
spring means normally urging said valve core into sealing engagement with said valve seat;
means closing the end of said first bore adjustment the inlet side of said valve seat;
a second bore in said housing adjacent the projecting end of said valve core;
an elongated locking member slidably mounted for limited axial movement in said second bore with an end projecting from said housing;
spring means normally urging said locking member to the limit of its axial movement in the direction of its projecting end;
a third bore communicating said first bore adjacent the outlet side of said valve seat with said second bore;
a peripheral groove in said valve core between its projecting end and the third bore when said valve core is in its normally spring urged position;
a peripheral groove in said locking member between its projecting end and the third bore when said member is in its normally spring urged position;
said peripheral grooves having tapered sides and being of substantially equal depth;
detent means mounted for axial movement in said third bore and extending for a distance greater than the length of said third bore but not greater than the length of said third bore plus the depth of one of said grooves such that at least one of said grooves contains a portion of said detent means at all times;
whereby movement of said valve core against the force of its associated spring means out of sealing engagement with said valve seat to a position in which its peripheral groove is aligned with said third bore, permits the force of the spring associated with said locking member to move said locking member to its normally urged position and thereby simultaneously to cam the detent means out of its peripheral groove and into the peripheral groove of said valve core to lock said valve open for flow through said passsage;
and whereby movement of said locking member against the force of its associated spring means to a position in which its peripheral groove is aligned with said third bore, permits the force of the spring associated with said valve core to move said valve core to its normally urged position and thereby simultaneously to cam the detent means out of its peripheral groove and into the peripheral groove of said locking member to close said valve to flow through said passage.
2. A push button valve comprising:
a housing having an inlet port and an outlet port communicated by a flow passage;
a first bore in said housing intersecting said flow passage and defining in common therewith a valve seat having a first side and a second side;
an elongated valve core slidably and sealingly mounted in said first bore with an end projecting from said bore end adjacent the second side of said valve seat;
spring means normally urging said valve core into sealing engagement with said valve seat;
means closing the end of said first bore adjacent the first side of said valve seat;
a second bore in said housing adjacent the projecting end of said valve core;
an elongated locking member slidably mounted for limited axial movement in said second bore with an end projecting from said housing;
spring means normally urging said locking member to the limit of its axial movement in the direction of its projecting end;
a third bore communicating said first bore adjacent the second side of said valve seat with said second bore;
a peripheral groove in said valve core between its projecting end and the third bore when said valve core is in its normally spring urged position;
a peripheral groove in said locking member between its projecting end and the third bore when said member is in its normally spring urged position;

said peripheral grooves having tapered sides and being of substantially equal depth;

detent means mounted for axial movement in said third bore and extending for a distance greater than the length of said third bore but not greater than the length of said third bore plus the depth of one of said grooves such that at least one of said grooves contains a portion of said detent means at all times;

whereby movement of said valve core against the force of its associated spring means out of sealing engagement with said valve seat to a position on which its peripheral groove is aligned with said third bore, permits the force of the spring associated with said locking member to move said locking member to its normally urged position and thereby simultaneously to cam the detent means out of its peripheral groove and into the peripheral groove of said valve core to lock valve open for flow through said passage;

and whereby movement of said locking member against the force of its associated spring means to a position in which its peripheral groove is aligned with said third bore, permits the force of the spring associated with said valve core to move said valve core to its normally urged position and thereby simultaneously to cam the detent means out of its peripheral groove and into the peripheral groove of said locking member to close said valve to flow through said passage.

3. A push button valve comprising:

a housing having an inlet port and an outlet port communicated by a flow passage;

a first bore in said housing intersecting said flow passage and defining in common therewith a valve seat having an inlet side and an outlet side;

an elongated valve core slidably and sealingly mounted in said first bore with an end projecting from said bore end adjacent the outlet side of said valve seat;

spring means normally urging said valve core into sealing engagement with said valve seat;

means closing the end of said first bore adjacent the inlet side of said valve seat;

a second bore in said housing adjacent the projecting end of said valve core;

an elongated locking member slidably mounted for limited axial movement in said second bore with an end projecting from said housing;

spring means normally urging said locking member to the limit of its axial movement in the direction of its projecting end;

a third bore communicating said first bore adjacent the outlet side of said valve seat with said second bore;

a notch in said valve core between its projecting end and the third bore when said valve core is in its normally spring urged position;

a notch in said locking member between its projecting end and the third bore when said member is in its normally spring urged position;

said notches having tapered sides and being of substantially equal depth;

detent means mounted for axial movement in said third bore and extending for a distance greater than the length of said third bore but not greater than the length of said third bore plus the depth of one of said notches such that at least one of said notches contains a portion of said detent means at all times;

whereby movement of said valve core against the force of its associated spring means out of sealing engagement with said valve seat to a position in which its notch is aligned with said third bore, permits the force of the spring associated with said locking member to move said locking member to its normally urged position and thereby simultaneously to cam the detent means out of its notch and into the notch of said valve core to lock said valve open for flow through said passage;

and whereby movement of said locking member against the force of its associated spring means to a position in which its notch is aligned with said third bore, permits the force of the spring associated with said valve core to move said valve core to its normally urged position and thereby simultaneously to cam the detent means out of its notch and into the notch of said locking member to close said valve to flow through said passage.

4. A push button valve comprising:

a housing having an inlet port and an outlet port communicated by a flow passage;

a first bore in said housing intersecting said flow passage and defining in common therewith a valve seat having a first side and a second side;

an elongated valve core slidably and sealingly mounted in said first bore with an end projecting from said bore end adjacent the second side of said valve seat;

spring means normally urging said valve core into sealing engagement with said valve seat;

means closing the end of said first bore adjacent the first side of said valve seat;

a second bore in said housing adjacent the projecting end of said valve core;

an elongated locking member slidably mounted for limited axial movement in said second bore with an end projecting from said housing;

spring means normally urging said locking member to the limit of its axial movement in the direction of its projecting end;

a third bore communicating said first bore adjacent the second side of said valve seat with said second bore;

a notch in said valve core between its projecting end and the third bore when said valve core is in its normally spring urged position;

a notch in said locking member between its projecting end and the third bore when said member is in its normally spring urged position;

said notches having tapered sides and being of substantially equal depth;

detent means mounted for axial movement in said third bore and extending for a distance greater than the length of said third bore but not greater than the length of said third bore plus the depth of one of said notches such that at least one of said notches contains a portion of said detent means at all times;

whereby movement of said valve core against the force of its associated spring means out of sealing engagement with said valve seat to a position in which its notch is aligned with said third bore, permits the force of the spring associated with said locking member to move said locking member to its normally urged position and thereby simultaneously to cam the detent means out of its notch and into the notch of said valve core to lock said valve open for flow through said passage;

and whereby movement of said locking member against the force of its associated spring means to a position in which its notch is aligned with said third bore, permits the force of the spring associated with said valve core to move said valve core to its normally urged position and thereby simultaneously to cam the detent means out of its notch and into the notch of said locking member to close said valve to flow through said passage.

5. The push button valve of claim 4 in which the projecting ends of the elongated valve core and the elongated locking member include distinctive visual indicia thereon.

6. The push button valve of claim 4 in which the inlet port and outlet port include external conduit connection means therein.

7. The push button valve of claim 4 in which the detent means are a plurality of ball detents.

8. The push button valve of claim 4 in which said detent means comprises a rod having bevelled edges at its ends.

9. The push button valve of claim 4 in which the elongated valve core is sealingly mounted in said first bore by means of an O-ring.

10. The push button valve of claim 4 in which the sealing engagement of said valve core with said seat is by means of an O-ring mounted on said valve core.

11. The push button valve of claim 4 in which the axial movement of said locking member is limited by a member mounted in said third bore on the side of said locking member opposite said detent means.

12. The push button valve of claim 4 in which said housing is mounted on an apertured panel with the projecting ends of said elongated valve core and said elongated locking member extending through said apertures and beyond said panel to the side opposite said housing.

13. A push button valve comprising:
a housing having an inlet port and an outlet port communicated by a flow passage;
a first bore having at least one open end in said housing intersecting said flow passage defining in common therewith a valve seat having a first side and a second side;
an elongated valve core slidably and sealingly mounted in said first bore for limited axial movement with an end projecting from said bore end;
means closing the end of said first bore opposite the projecting end of said valve core;
a second bore in said housing adjacent the projecting end of said valve core;
an elongated member slidably mounted for limited axial movement in said second bore with an end projecting from said housing;
a third bore communicating said first bore with said second bore;
detent means movably mounted within said third bore such that when said valve core projects the maximum amount its limited axial movement permits it to project the locking member projects the minimum amount its limited axial movement permits it to project and when said valve core projects the minimum amount its limited axial movement permits it to project said locking member projects the maximum amount its limited axial movement permits.

14. A push button valve comprising:
a housing having an inlet port and an outlet port communicated by a flow passage;
a first bore in said housing intersecting said flow passage and defining in common therewith a valve seat having a first side and a second side;
an elongated valve core slidably and sealingly mounted in said first bore for limited axial movement with an end projecting from said bore end;
spring means normally urging said valve core in a first direction with respect to said valve seat;
means closing the end of said first bore opposite the projecting end of said valve core;
a second bore in said housing adjacent the projecting end of said valve core;
an elongated locking member slidably mounted for limited axial movement in said second bore with an end projecting from said housing;
spring means normally urging said locking member to the limit of its axial movement in the said first direction;
a third bore communicating said first bore with said second bore;
a peripheral groove in said valve core between its projecting end and the third bore when said end projects the maximum amount its limited axial movement permits;
a peripheral groove in said locking member between its projecting end and the third bore when said end projects the maximum amount its limited axial movement permits;
said peripheral grooves having tapered sides and being of substantially equal depth;
detent means mounted for axial movement in said third bore and extending for a distance greater than the length of said third bore but not greater than the length of said third bore plus the depth of one of said grooves such that at least one of said grooves contains a portion of said detent means at all times;
whereby movement of said valve core to a position in which its peripheral groove is aligned with said third bore, permits movement of said locking member simultaneously to cam the detent means out of its peripheral groove and into the peripheral groove of said valve core;
and whereby movement of said locking member to a position in which its peripheral groove is aligned with said third bore, permits movement of said valve core to cam the detent means out of its peripheral groove and into the peripheral groove of said locking member.

15. A push button valve comprising:
a housing having an inlet port and an outlet port communicated by a flow passage;
a first bore having at least one open end in said housing intersecting said flow passage defining in common therewith a valve seat;
an elongated valve core slidably and sealingly mounted in said first bore for limited axial movement with an end projecting from said open bore end;
a second bore in said housing adjacent the projecting end of said valve core;
an elongated member slidably mounted for axial movement in said second bore with an end projecting from said housing;
a third bore communicating said first bore with said second bore, and
detent means movably mounted within said third bore such that when said valve core projects the maximum amount its limited axial movement permits it to project, the locking member projects the minimum amount its limited axial movement permits it to project, and when said valve core projects the minimum amount its limited axial movement permits it to project, said locking member projects the maximum amount its limited axial movement permits.

References Cited
UNITED STATES PATENTS

| | | | |
|---|---|---|---|
| 1,679,219 | 7/1928 | Huff | 251—111 |
| 2,888,025 | 5/1959 | Greenwood et al. | 251—74 |
| 2,995,951 | 8/1961 | Evans | 74—483 |
| 3,104,813 | 9/1963 | Baatrup | 137—637.1 |
| 3,165,120 | 1/1965 | Horowitz | 251—297 |

FOREIGN PATENTS

| | | |
|---|---|---|
| 481,588 | 6/1953 | Italy. |

M. CARY NELSON, *Primary Examiner.*

R. C. MILLER, *Assistant Examiner.*